United States Patent [19]

Crawford

[11] Patent Number: 4,623,312

[45] Date of Patent: Nov. 18, 1986

[54] CHANGEABLE MODULAR TRAINING SYSTEM TO PROVIDE INSTRUCTION FOR INSTALLING, SERVICING, TROUBLESHOOTING AND OPERATING ELECTROMECHANICAL CONTROL SYSTEMS

[75] Inventor: Larry C. Crawford, Redmond, Wash.

[73] Assignee: Training Labs, Inc., Redmond, Wash.

[21] Appl. No.: 666,977

[22] Filed: Oct. 31, 1984

[51] Int. Cl.$^4$ ............................................. G09B 9/00
[52] U.S. Cl. ................................... 434/224; 434/366; 434/379; 434/380
[58] Field of Search ............... 434/224, 366, 379, 380, 434/401

[56] References Cited

U.S. PATENT DOCUMENTS

| | | | |
|---|---|---|---|
| 2,788,470 | 4/1957 | Giel et al. | 434/224 |
| 3,018,568 | 1/1962 | Tischler | 434/224 |
| 3,456,363 | 7/1969 | Boxley | 434/366 |
| 3,540,135 | 11/1970 | Alcosser et al. | 434/224 |

FOREIGN PATENT DOCUMENTS 1143937  4/1983  Canada ............................... 434/224

Primary Examiner—Leo P. Picard
Attorney, Agent, or Firm—Roy E. Mattern, Jr.

[57] ABSTRACT

A module for use in a training system assembly which includes a power base is multi-sided and includes mechanical-electrical feet on one side for jacking the module into the power base or into a second module. Detent spring latches are disposed on another side of the module for receiving the feet of a second module atop the first module. The module is hollow and an electrical component is mounted therein. The component is an electrical connection with the feet and the detent spring latches. A display is on a third side of the module and the rear of the module includes a fault selector switch which causes the component to be in either an operating configuration or a fault configuration.

21 Claims, 20 Drawing Figures

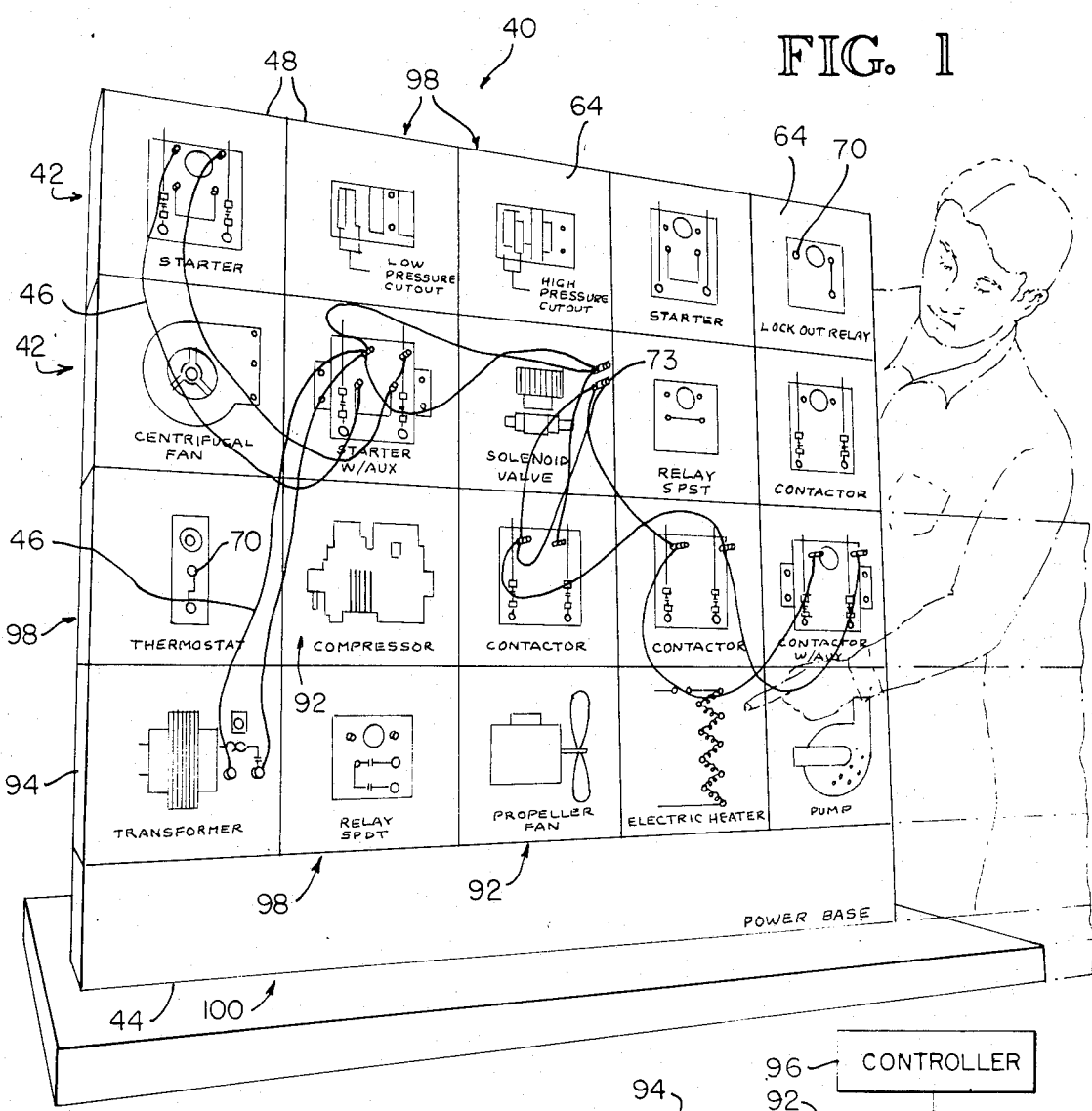
FIG. 1
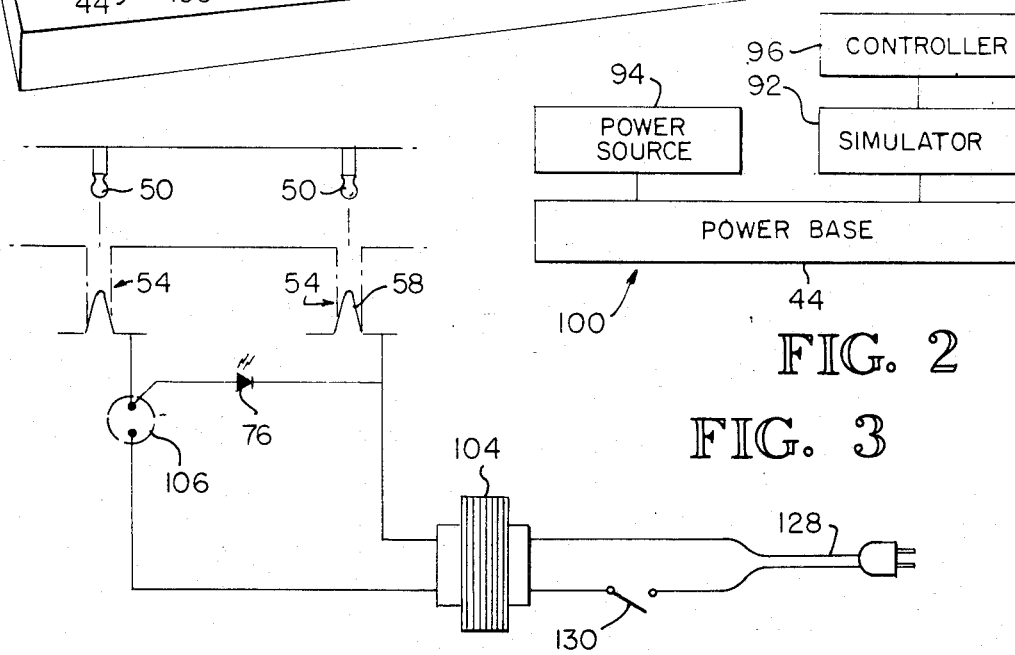
FIG. 2
FIG. 3

CHANGEABLE MODULAR TRAINING SYSTEM TO PROVIDE INSTRUCTION FOR INSTALLING, SERVICING, TROUBLESHOOTING AND OPERATING ELECTROMECHANICAL CONTROL SYSTEMS

BACKGROUND OF THE INVENTION

A variety of training apparatuses and instructional equipment been developed for mechanical and electrical systems. Many of these training apparatuses involve the use of equipment which can be used for testing circuits, for example, or educating the student in basic electrical wiring.

Ackerman, U.S. Pat. No. 4,316,720 has developed a maintenance training device which allows students to learn hands-on maintenance and training of electronic systems using simulated components.

Schager, U.S. Pat. No. 3,237,318 presents an apparatus for simulating the operation of an electrical power plant. The equipment used in the Schager invention shows the student actual components of a generating plant so as to be able to follow the sequence of operation of the system.

The majority of the training systems do not permit the student to experience working with a basic electromechanical system which may be modified to provide a more complex system that may be encountered at a job site.

Apparatuses, such as that of the Schager patent, utilize large pieces of equipment which are fixed in position and may not be modified to represent different electro-mechanical systems.

Other teaching and testing devices have been developed such as that of Gudelis et al., U.S. Pat. No. 4,213,253; Wahl et al., U.S. Pat. No. 4,198,768; and Hill et al., U.S. Pat. No. 4,112,593.

This latter patent of Hill's is used for the construction as well as testing of electrical circuits.

Within the electrical and mechanical systems fields, there has remained a need to provide a portable training system which would allow the students to interchangeably costruct and troubleshoot an actual control system which could be done in a classroom setting.

Another important need of teaching electrical and mechanical control systems is having the means to teach students at all levels by using a system which incorporates interchangeable components whereby a simple electro-mechanical system may be developed as a foundation for beginning students. That same system should be adaptable to increase the complexity and vary the capabilities of the system for more advanced students.

The present invention serves to meet these needs by establishing a modular training system which provides students at all levels with the ability to experience hands on training of an actual working control system as might be encountered on a job site.

SUMMARY OF THE INVENTION

A changeable modular electrical control training system is established to provide hands-on training and teaches students about the installation, servicing, troubleshooting and operation of electrical control systems. The training system comprises a plurality of hollow structural electro-mechanical cubes which are adapted for removable attachment to a hollow structural power base or alternatively to an operating mechanical refrigeration training system (E.L.R.T.) The use of the power base or E.L.R.T. provides versatility in teaching control system sequence wiring. Each of the cubes is adapted for combined mechanical and electrical connection to the power base or alternatively to another cube. The cubes thus provide a simple to operate system which establishes a simple control system for teaching beginning students. The same control system may be modified by adding more cubes in various selectable arrangements to provide increased complexity and versatility of a control system which is designed for instructing advanced students.

The various cubes include simulators, controllers and source cubes which represent components of an on-site control system. The students may then gain familiarity with a variety of complete control systems. Each of the cubes includes conventional electromechanical components which function similarly to the systems encountered in the field or at a job site. Wiring inside the cubes is adapted to establish indicator light power circuitry and control system circuitry. The control system circuitry includes internal wiring in the cubes and is completed by the student using external patch cords to connect the cubes according to the instructor designed control circuit. The student is thus provided with hands-on training in how to establish sequence wiring of various control systems. Rather than learning basic electrical wiring concepts, the student is provided with an opportunity to establish specific circuits and build increasingly more complex control circuits with this adaptable system. Faults or failures may also be entered into the control system circuitry by the instructor to provide the student with troubleshooting problems that he or she must correct after establishing the location of these faults using conventional testing equipment. The control system may be adapted to operate with actual mechanical training systems, such as the entry level refrigeration trainer (E.L.R.T.), as well as the power base. The E.L.R.T. provides for automatic operation of some of the control cubes which would otherwise simulate operation through electrical switching means. The E.L.R.T. or other operational mechanical systems also provide an alternative power source, as well as a mounting structure for the cubes. The training system may be used in a variety of teaching applications for various electrical and mechanical systems.

BRIEF DESCRIPTION OF THE DRAWING

FIG. 1 is an environmental view of the training system being operated by the instructor.

FIG. 2 is a block diagram of the minimum number of components required to provide an operable control system.

FIG. 3 is a schematic diagram of the power base including the connecting feet of a cube being positioned for insertable connection into the power base.

DESCRIPTION OF THE PREFERRED EMBODIMENTS

Figure 4:
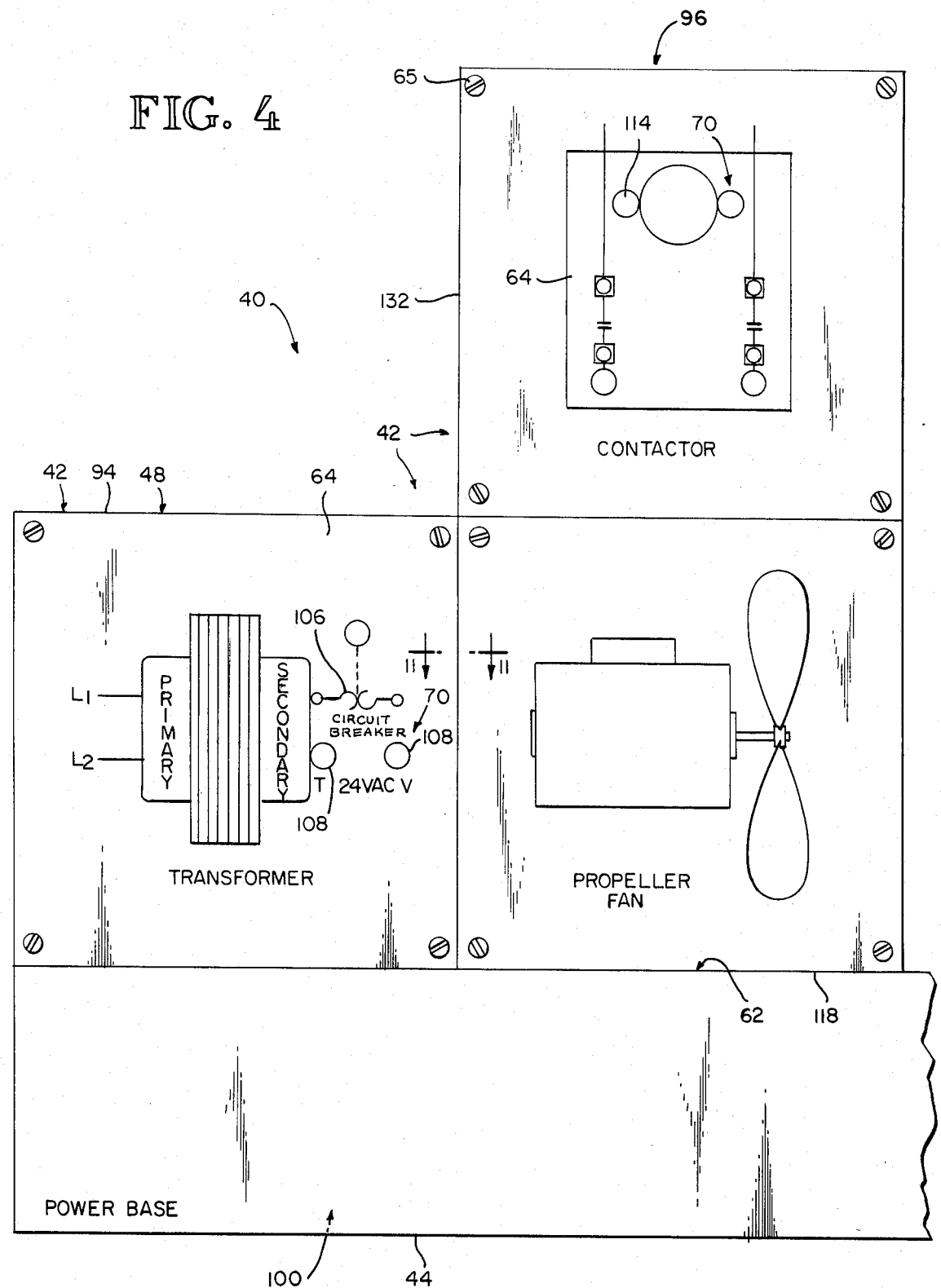
FIG. 4 is an enlarged sectional front view showing selected examples of each of the three basic cubes and the power base required for an operable control system.

The present invention comprises a changeable modular electrical control training system 40 or training system 40, used by instructors to train students, technicians or engineers in installation, servicing, troubleshooting and operational procedures of electrical control systems used with various kinds of machinery or with refrigeration, heating or ventiation systems and the like. In a classroom or learning environment, the student is provided with "hands on" training ability which requires the student, for example, to use conventional methods and equipment in troubleshooting the training system 40 as would be done in the field or at a job site.

As shown in FIG. 1, the preferred embodiment of the training system 40 broadly comprises a plurality of hollow structural electro-mechanical cubes 42 removably secured to a hollow structural power base 44 which provides electrical power to the cubes 42. Each cube 42 includes various conventional electrical and mechanical components, such as motors, relays, thermostats and circuit breakers, mounted inside of it and represents an element of a typical electro-mechanical control system. The cubes 42 are adaptably wired internally to receive and transfer electrical power from the power base 44 to other cubes, as well as to be wired together externally with control circuit patch cords 46, as shown in FIG. 1. The cubes 42 are, alternatively stacked on the power base or on top of each other to form the desired arrangement of components of an operable electro-mechanical control system. External wiring of the cubes to each other establishes the desired control system circuitry designed by the instructor. The student may be asked to construct the required system by assembling the cubes 42 and wiring them together rather than having the instructor doing it. In such case, the student must establish the correct wiring sequence to complete an instructor designed control system circuit, thereby learning installation of a control system typically found at a job site.

Each cube 42 is adapted to simulate control system failures by faults being entered into the system by the instructor. Using conventional testing equipment, such as a voltmeter, the students determine where faults in the control system are located by systematically checking the wiring sequence and cubes 42, thereby learning troubleshooting and maintenance techniques similar to those encountered in the field.

An alternative embodiment of the training system incorporates an actual operating mechanical refrigeration training system referred to as an E.L.R.T. or entry level refrigeration trainer. The E.L.R.T. may be used in place of the power base 44 to allow for automation of those cubes 42 which normally sense external environmental conditions, such as temperature or pressure differential in functioning in an on-site control system. The E.L.R.T. will generate a real temperature change to operate a thermostat cube, for example, which would otherwise require an on-off switch to simulate temperatures going above or below a set point. The E.L.R.T. also serves as an alternative power source for the cubes 42.

The Cubes of the Training System are Broadly Referred to as Source Cubes, Simulator Cubes and Controller Cubes The cubes of the modular training system 40 are designed to represent actual electro-mechanical components within an operable electrical control system. The components include simulated operable equipment or machinery, as well as the various electro-mechanical controlling control which allow the equipment to perform its various functions, according to the requirements of the system, as would be found at a real job site. Some cubes, such as a relay control cube, include a conventional electro-mechanical component inside, such as a contact relay. Other cubes, such as a remote thermostat control cube 126, utilize switching means inside the cube to simulate the operation of the electrical component, such as a stat. Electrical wiring inside the cube 42 connects the components and adapts the cube 42 to receive and transfer power in the system as well as establish control system, circuitry designed by the instructor.

Figure 9:
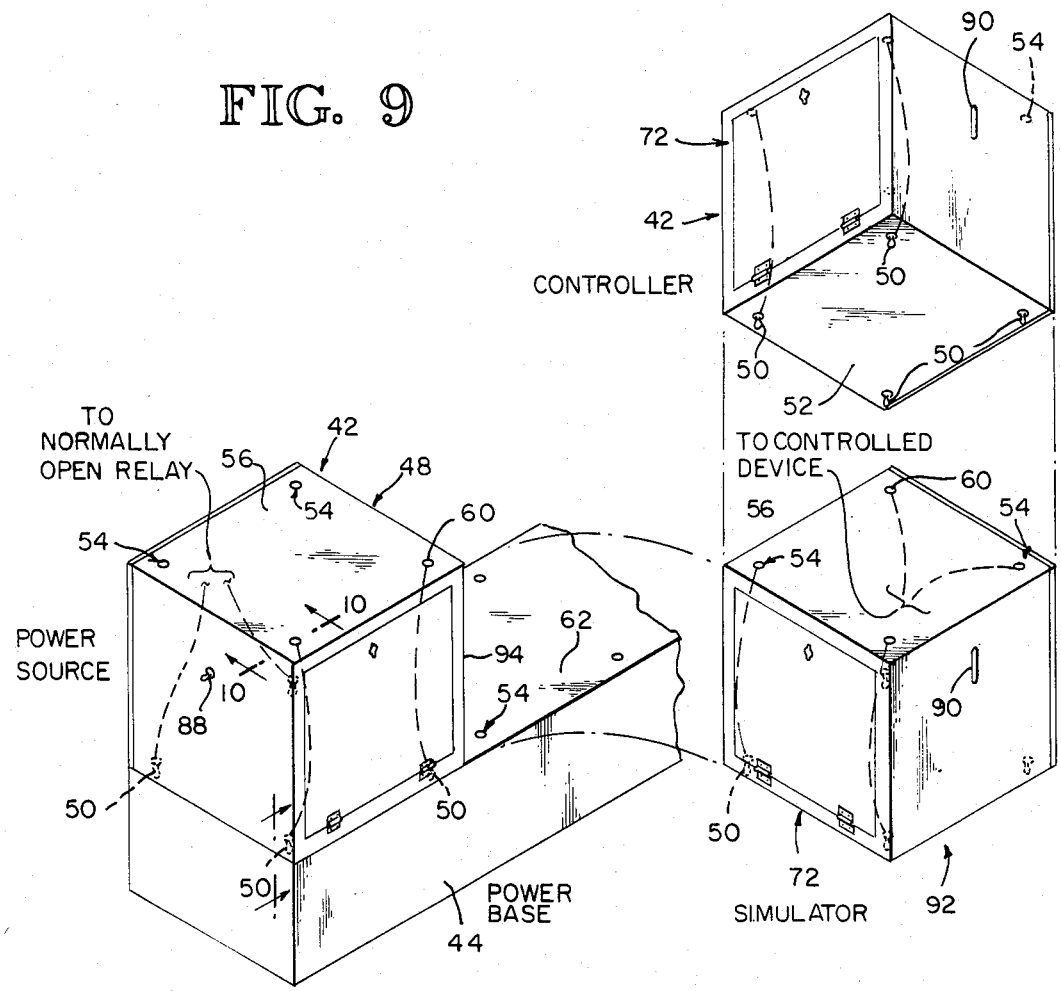
FIG. 9 is an exploded view of the cubes showing adaptive attachment between the feet and connectors as well as the two basic sources of power for the circuitry of the cubes.
Figure 10:
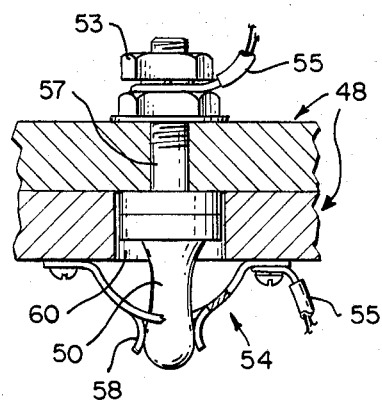
FIG. 10 is an enlarged sectional view taken across line 10—10 in FIG. 9 showing the foot insertably connected in the detent spring latch of the connector.
Figure 11:
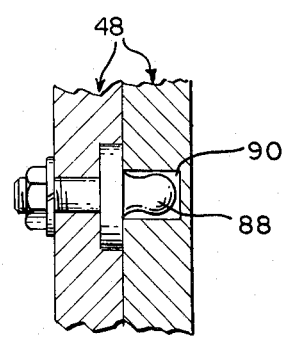
FIG. 11 is an enlarged sectional view showing the mounting peg inserted into the elongated vertical slot of the adjacent cube.

The cubes 42 are adapted for removable and optional mounting either to the top of the power base 44 or on top of another cube 42, selectably arranged in building block fashion as shown in FIGS. 1, 4 and 16–18. The cubes 42 each comprise a hollow enclosure 48 which is preferably rectangular shaped and made of wood or a composite material and have a durable exterior surface, such as formica. Mechanical-electrical connecting feet 50 depend from each of the four corners of the bottom surface 52 of each cube adjacent to each of the four corners, as shown in FIGS. 2 and 9–11. FIG. 10 shows a foot 50 secured to the hollow structure 48 by threaded nuts 53. A wire lead 55 from the cube circuitry is electrically connected to a shaft 57 which is in turn secured to the foot 50. Corresponding and like mechanical-electrical connectors 54 are adaptably mounted below the top surface 56 of each cube 42 adjacent to each of the four corners to each receive a foot 50, as shown in FIGS. 9–11. The connectors 54 of each cube include detent spring latches 58 which may securely receive connecting feet of another cube mounted on top of it, as shown in FIG. 10. Electrical connection is made through wire lead 55 secured to the spring latch 58. The connectors 54 are accessible through apertures 60 on the top surface 56 of the cube 42, as shown in FIG. 9. Like mechanical-electrical connectors 54 are also correspondingly positioned on the top surface 62 of the power base 44. Selected cubes 42 may be then interchangeably plugged into the power base 44, with other cubes 42 thereafter being stacked on top of the first cube 42 as shown in FIGS. 1, 4 and 16–18. The coupling of the feet 50 and connectors 54 provides combined mechanical-electrical connection of the cubes 42 to the power base 44 and to each other. In addition to providing structural support for the cubes 42 when stacked, the feet 50 of a cube, when inserted into connectors 54 of another cube or the power base, establish and continue power for the system, comprising an electrical indicator light power circuit (shown by solid lines in schematic diagrams of FIGS. 6 and 7 and indicated generally as L) from the power base through the cubes, as shown in FIG. 9.

Figure 14:
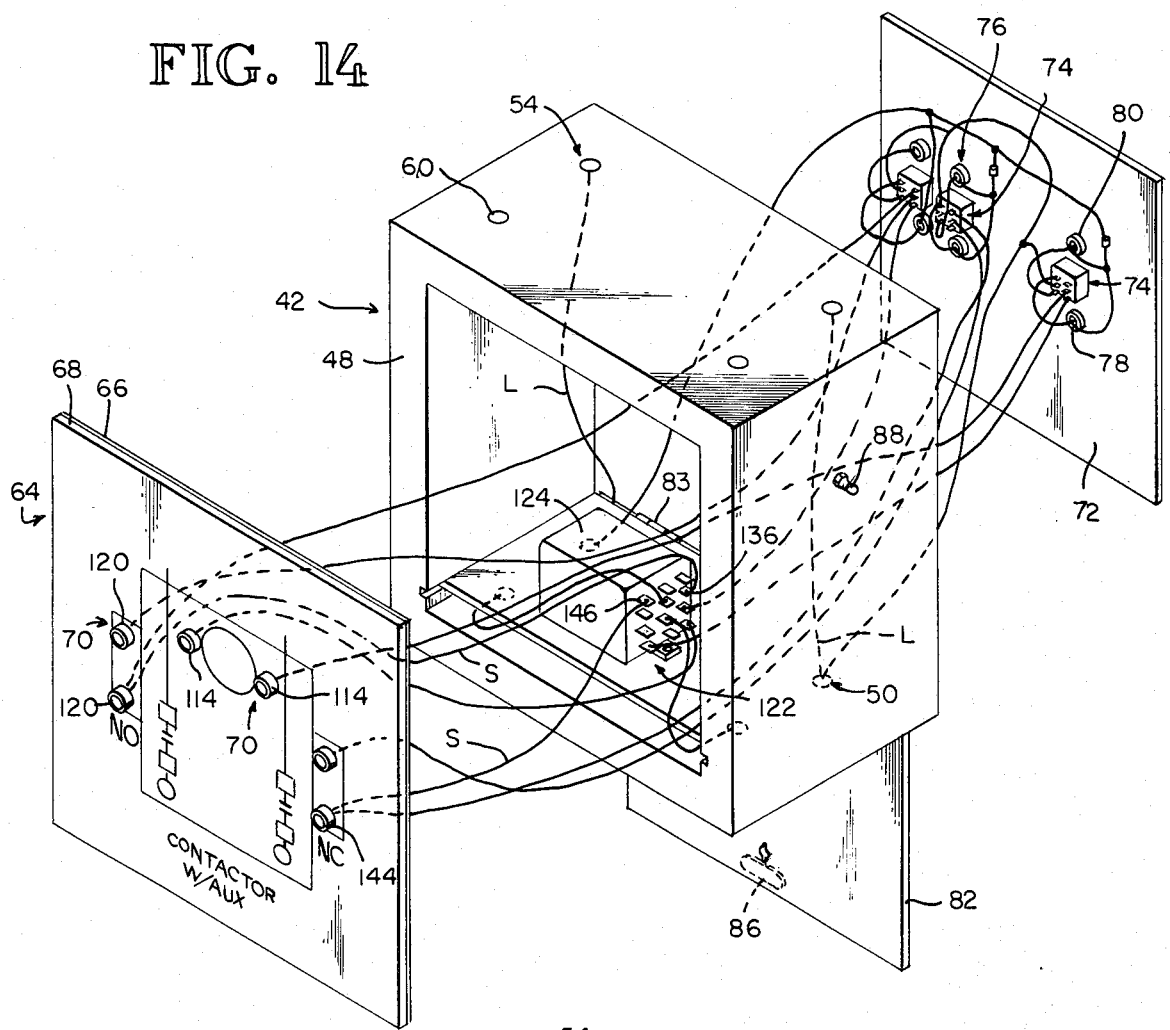
FIG. 14 is an exploded perspective view of the contactor with auxiliary cube showing internal circuitry.

A face plate 64 is secured to the front of each cube 42 with conventional fasteners 65, as best shown in FIG. 4, and includes a pictorial diagram identifying the particular electrical component represented by the cube. The face plate 64 preferably comprises an appropriate pictorial diagram sheet 66 secured to and displayed behind a Plexiglas cover 68 as shown in FIG. 14. The face plate 64 may alternatively be formed from a single piece of material, using a painted or color plastic diagram display for example.

Color coded electrical terminals 70 are internally wired in the cube 42 and extend through the face plate 64, as shown in FIGS. 1, 4 and 14. The terminals 70 are adapted to receive male wire plugs 73 of the control circuit patch cords 46 and allow the cubes 42 to thus be externally wired together to complete the electrical control circuits of the system designed by the instructor. Rear panels 72 enclose the back of each hollow enclosure 48.

Figure 5:
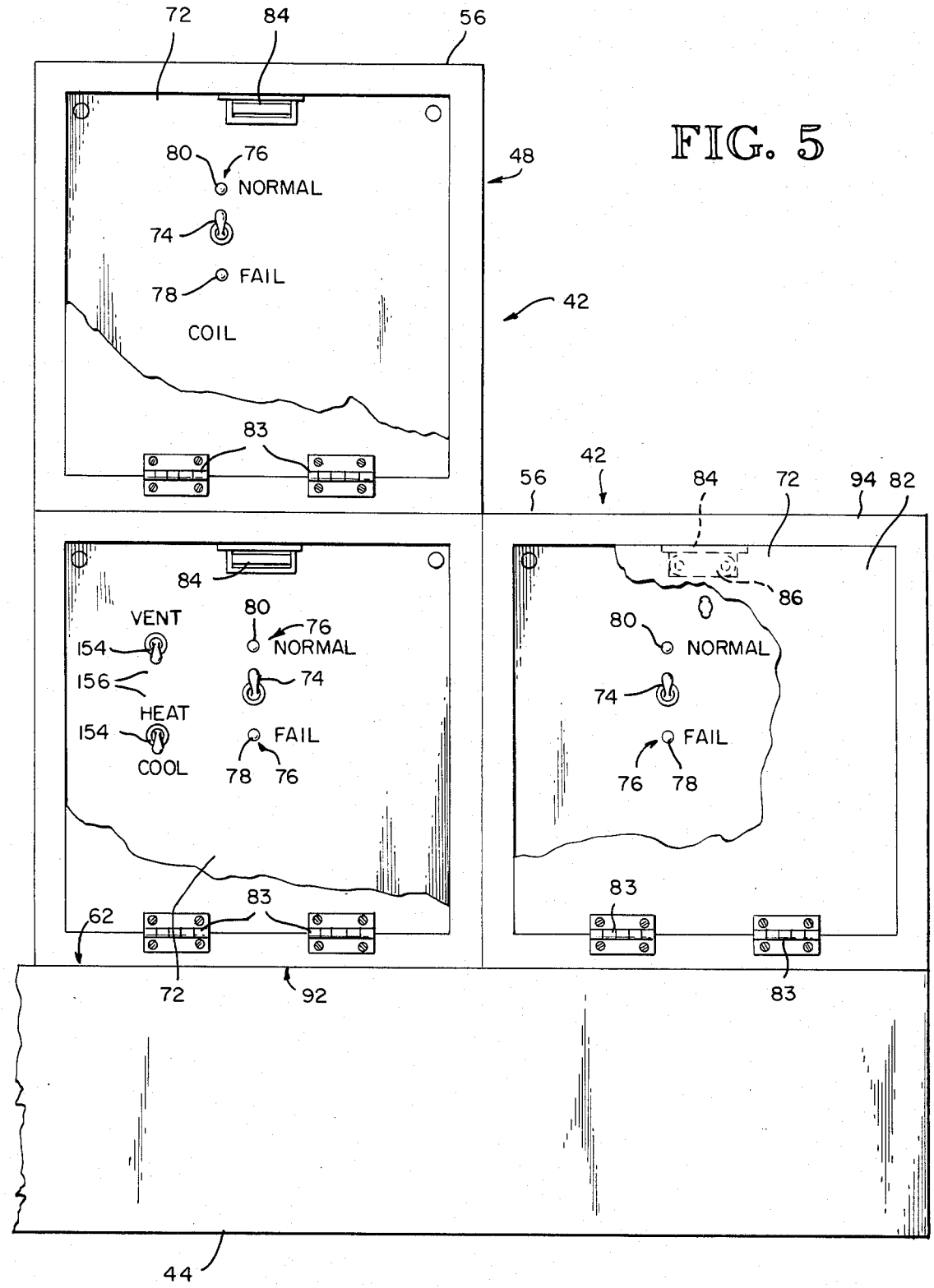
FIG. 5 is an enlarged sectional back view of the cubes.

Faults or failures in the control system may be entered by positioning a fault selection switch on the rear panel. One or more fault selection switches 74 are mounted on each rear panel 72 and are internally wired to the electrical control system circuits in the cube. The fault selection switches 74 are operated by the instructor to either open or close an electrical circuit in the cube at that juncture of the system, thereby activating or deactivating a particular fault in the control system circuitry as selected by the instructor. Two different colored indicator lights 76, utilizing L.E.D.s, are mounted next to each fault selection switch 74 and internally wired in the cube to indicate which position the fault selection switch is in. The indicator lights 76 thus reflect whether a particular fault in the system is activated whereby a red fail indicator light 78 is lit. When no fault is entered into the control system circuitry, the system operates normally whereby a green normal indicator light 80 is lit. A lockable door 82 is secured to the back of each cube 42 and may be used to cover the rear panel 72 and make the fault selection switches 74 inaccessible to the students, for example, as shown in FIGS. 5 and 14. The door 82 is preferably secured with hinges 82 to the back of each cube. A magnetized latch 84 mounted on the back of each cube 42 holds the door 82 when in the closed position as shown in FIG. 5. A corresponding metal tab 86 is secured to the door.

Introduction to Wiring of the Training System: The Cubes of the Training System Broadly Comprise Indicator Light Power Circuitry and Control System Power Circuitry Two basic electrical circuits are established in the training system. An indicator light power circuit is comprised of the power base 44 and the cubes 42 stacked up on top of the power base. The indicator light circuitry wiring is established internally in the cubes and power base. A control system circuit is established by a source cube and a plurality of starter or contactor cubes, simulator cubes and control cubes. The control circuitry is established by internal wiring and components in the cubes as well as external wiring by control circuit patch cords.

Figure 15:
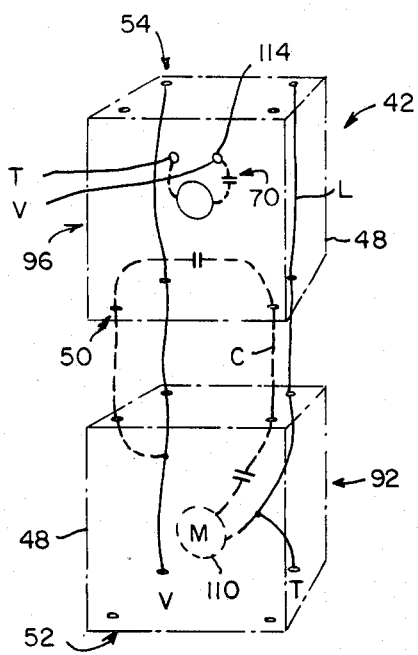
FIG. 15 is a perspective block diagram simulating the contactor and simulator cubes showing the two basic circuits in the cubes.

Within each cube are wiring assemblies which supply power to the cube 42 and adaptably permit transfer of electrical power to another cube 42 in the system. An indicator light power circuit L is wired in each cube extending from the back connecting feet 50 to the indicator lights 76 and then continuing up to the connectors 54 at the top of the cube, shown schematically in FIG. 9. Continuous power is thereby provided to the cubes from their back connecting feet 50 through their connectors 54, as shown in FIG. 15. Electrical current may then be continually supplied from the power base 44 directly through the feet 50 and the connectors 54 of the cubes 42 to power the L.E.D. indicator lights 76 on the rear panel 72 of each cube 42. Transfer of controlled or reduced current to the various controller and simulator cubes and electro-mechanical components in these cubes is generally accomplished by external wiring with control circuit patch cords 46 from a source cube 94 to establish control system power circuitry, referred to in FIGS. 6–8 and 19 as C. The specific methods of providing electricity to the cubes in completing control system circuits will be described more fully below. For most cubes however, the internal wiring of this circuitry connects the color coded electrical terminals 70 with the various electro-mechanical components of the cube 42 and the fault selection switch 74 or switches which open or close the circuits, representing the failures entered into the control system.

A mounting peg 88 depends from one side of each cube 42 while the other side of each cube 42 contains an elongated vertical slot 90. While the cubes 42 are being assembled on the power base 44, the mounting peg 88 of each cube is insertably positioned within the slot 90 of the adjacent cube to provide additional lateral support of the structure of stacked cubes. Electrical power is not transmitted by the mounting pegs 88.

The hollow structural electro-mechanical cubes 42 are generally classified as simulators or controllers. Simulators comprise simulator cubes 92 which represent operable machinery or equipment such as a compressor, fan or the like as would be found at a job site. The controllers serve as the various electro-mechanical components in the control system which act as switching means to otherwise regulate the operation of the simulator cubes 92. Electrical circuits and the desired control systems are thus established by combining one or more simulator cubes 92 with a plurality of controllers to provide the student with hands on training in working with a control system that would likely be encountered in the field.

As would be found in an on site control system, the controllers further include a source cube 94, primary power control cubes 96 and control cubes 98. The source cube 94 will hereafter be referred to as the transformer cube 94 and the primary power control cube 96 will be referred to in general terms as a starter or contactor cube 96. To provide a usable control system, power is supplied from the power base 44 to the transformer cube 94, which is in turn electrically connected in a control system circuit with a simulator cube 92 and a starter or contactor cube 96. Increasing complexity and capability of the control system may be accomplished by stacking additional controllers and/or simulators onto the power base 44, as well as on top of each other as shown in FIGS. 1 and 16-18. The various cubes 42 and some of their features are more fully described below.

The Power Base of the Modular Training System

The power base 44 provides the source of reduced voltage electrical power for the system, as well as a mounting apparatus for the cubes. The power base comprises an elongated rectangular hollow enclosure 100 having a plurality of sets of four mechanical-electrical connectors 54 spaced apart with apertures 60 on its top surface as shown in FIG. 3. The connectors 54 are internally wired within the power base 44 and are adapted to receive the feet 50 of the cubes and provide electrical contact as well as structurally supportive connection for the cubes.

The power base 44 is plugged into an ordinary household outlet to receive standard 120 volt electricity and is switched on by a power switch 130. The primary voltage then passes through a transformer 104 in the power base 44 which then reduces the line-in power to 24 volts. Reduced voltage is thereafter transmitted through a circuit breaker 106 to the connectors 54, as shown in the diagram in FIG. 3. Power may then be received by the feet 50 of the various cubes 42 in the control system.

The power base 44 is designed to adaptively mount five cubes 42 along its length and to safely provide power for twenty total cubes, stacked four high. Alternative embodiments of the power base, using a different transformer with increased transformer power could possibly accommodate an increased number of cubes.

As previously mentioned, the power base also has a built in circuit breaker 106 to protect against overloads. For extra stability the power base may be clamped to a table top with C-clamps for extra stability when in use with the cubes.

Figure 6:
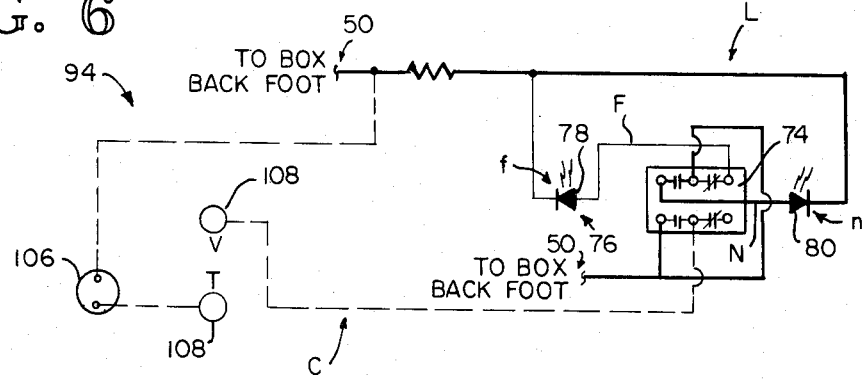
FIG. 6 is a schematic diagram of the transformer cube.
Figure 16:
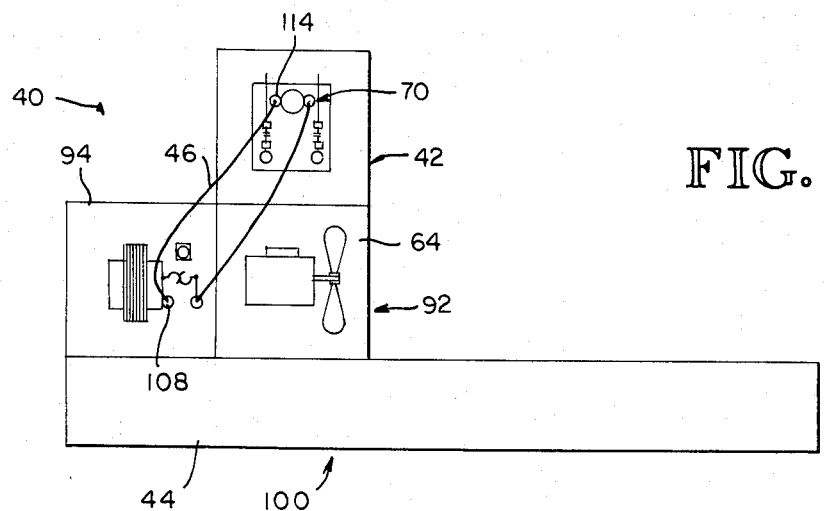
FIG. 16 is a front elevational view of the basic control system comprising a contactor cube, transformer cube and simulator cube on the power base.

The Transformer Cube Serves as a Secondary Power Source Cube, Simulating a Primary Voltage Reduction Means and Transferring Reduced Voltage for the Control Circuits to Simulator and Controller Cubes via External Wiring The transformer cube 94 represents an acutal transformer, reducing line-in voltage to secondary voltage and serving to transfer this reduced voltage to simulator cubes 92 and other controllers. For practical purposes, primary line-in power is reduced in the power base. Consequently, the transformer cube 94 merely simulates this function. The transformer cube 94 becomes completely energized through its feet 50. That is to say that both the indicator light power circuit L and the control system power circuits C are wired internally to receive electrical power from the feet 50, as shown in FIG. 6. As previously discussed, all cubes, including the transformer cube, are each adaptively internally wired from the back connecting feet 50 to the indicator lights 76 of the rear panel 72 and from there to the connectors 54 at the top of the cube. The transformer cube 94, however, is internally wired to also adaptively transfer the power received from its back feet 50 through a circuit breaker 106 and a fault selection switch 74 to the electrical terminals 70 at the face plate 64 as shown in FIG. 6. To establish the beginning of the control system circuit, control circuit patch cords 46 are plugged into the "T" and "V" terminals 108 of the face plate 64 and into the terminals 70 of a contactor or starter cube 96 as shown in FIG. 16. Additional control cubes 98 may be energized in similar fashion and wired into the control system circuit using external wiring between the electrical terminals 70 on the face plates 64.

The transformer cube 94 may be plugged directly onto the power base 44 or on top of another cube 42 as its control system circuitry power is received internally from the indicator light power circuit wired through its back feet 50. The transformer cube 94 is thus used to provide the controlled power for the student wired control system circuits.

The Simulator Cubes of the Modular Training System

The simulator cubes 92 represent operable machines or equipment the student is likely to encounter at a job site, such as a compressor, heater, fan or the like. The indicator light power circuit L and control circuits C are shown schematically in FIG. 8. Presently, the simulator cubes for the training system include a compressor, propeller fan, centrifugal fan, pump, heater, solenoid valve, gas valve and a reversing valve. In normal operation, a fan, compressor, etc. are powered directly by line in primary voltage. To simulate this, power to the simulator cubes 92 is received internally from the starter or contactor cube 96, (shown in FIG. 15) which will be discussed in more detail below.

As shown in FIG. 15, all but the heater simulators include a small operable electric motor 110 mounted inside which operates when energized by a contactor or starter cube. When energized, the electric motor 110 in turn, rotates a wheel (not shown), for example, or otherwise operates to simulate moving parts in the simulator cube 92. The face plate 64 of the simulator cube is adapted with holes for the simulated moving parts to be observed in motion thereby signifying that the control system circuit is made with the simulator cube and the system is correctly wired up to that point.

Figure 8:
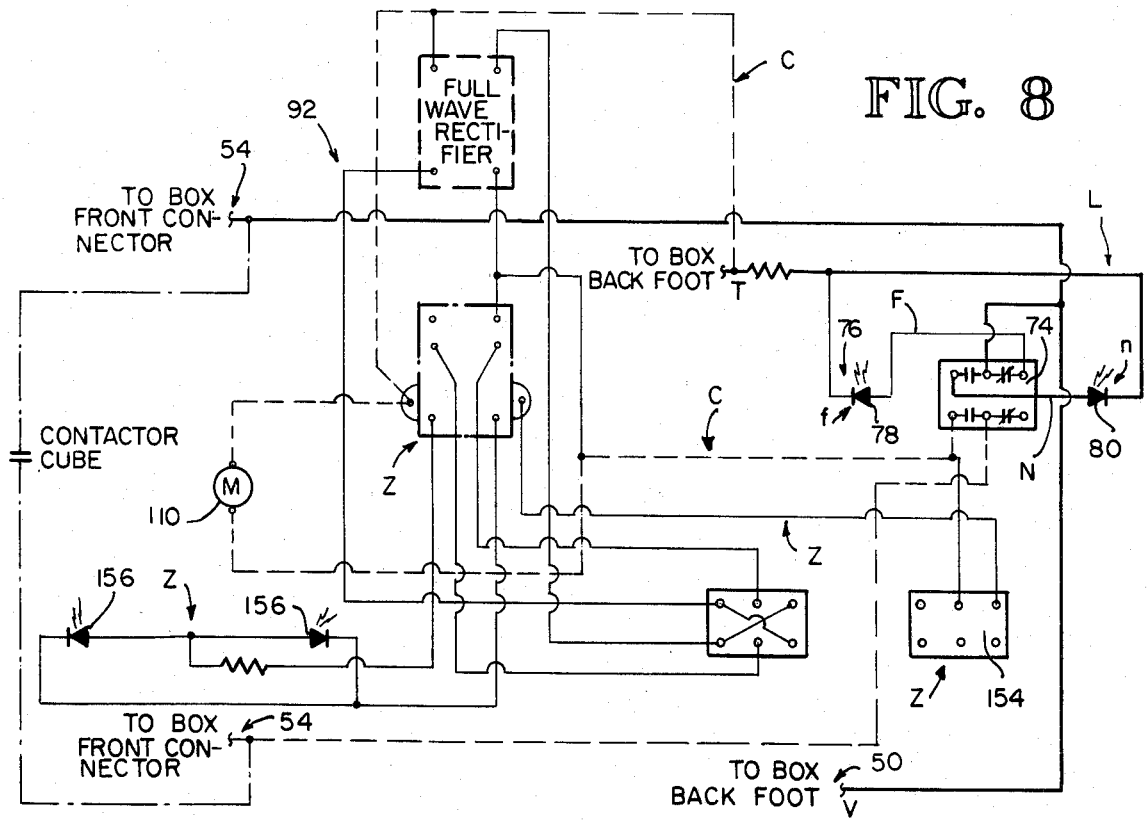
FIG. 8 is a schematic diagram of the propeller fan simulator cube.

Power for the control system circuitry is supplied for all simulators 92 through its internal wiring and from connection to a starter or contactor cube 96, except for the gas and solenoid valves, rather than through external wiring, required with the contactor or starter cubes and other control cubes. Control system circuitry wiring leads from the front connectors of the simulator cube down through a fault selection switch 74 and the electric motor 110 and is wired into the indicator light power circuit, as shown in FIGS. 8 and 15. Indicator light power circuitry provides continuous power to the indicator lights as well. Because the simulator cubes 92 uniquely derive their control system circuit power from the front feet of the contactor or starter cube 96, it is required that a contactor or starter be plugged into the top of the simulator it operates. In all other cases, the transformer cube and other control cubes, for example, may be positioned anywhere in the stack of cubes forming various arrangements on the power base.

The Primary Voltage Control Cube of the Training System is Represented by Either a Starter or Contactor Cube With the exception of the gas valve and solenoid valve simulators, the control system requires the use of a starter or contactor cube 96 to provide control system circuit power to the simulators. The starter or contactor 96 simulates the transfer of primary power from a line voltage source (power base) to a line voltage load (simulator cube) when reduced voltage from the transformer cube 94 is applied. These cubes include the starter, contactor, starter with auxiliary and contactor with auxiliary cubes. General reference will hereafter be made to these cubes as a starter or contactor 96.

Figure 7:
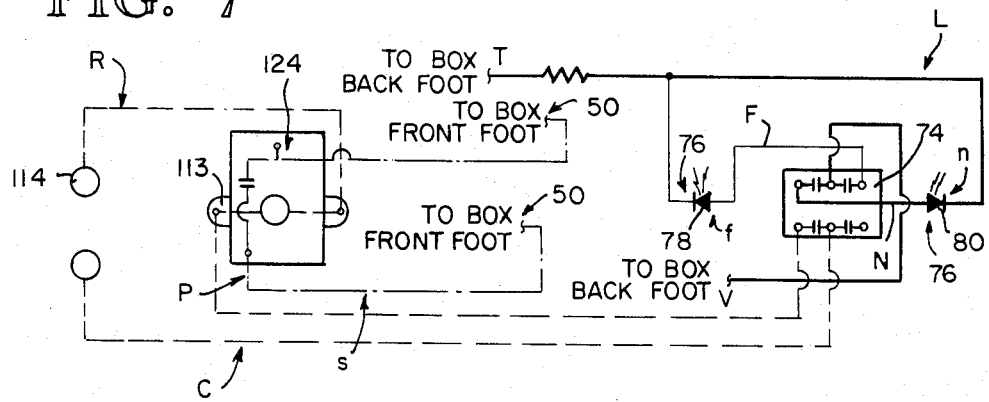
FIG. 7 is a schematic diagram of the contactor cube.

The control system circuitry of the starter or contactor cube is wired internally from the holding coil terminals 114 on the face plate 64, through a holding coil and through a fault selection switch 74 on the rear panel 72, as shown in FIG. 7. It thus becomes necessary for the contactor or starter cube 96 to be placed directly on top of the simulator cube 92 which it controls, with the exception of the valve simulators. These valve simulators are controlled internally and thus an external wiring circuit may transfer power directly between the transformer cube and the valve simulator.

As shown in FIG. 7 the starter or contactor cubes may be shown to broadly comprise three different electrical circuits. The continuous indicator light power circuit (L) extends from the feet 50 through the indicator lights 76 to the connectors 54. A power transfer circuit (P) to the simulator is established from the holding coil terminals 114 to the front connecting feet 50. The control system circuit (C) is established between the holding coil terminals 114 (and auxiliary input terminals in the case of contactor with auxiliary and starter with auxiliary) on the face plate 64 through the fault selection switches 74 on the rear panel 72. In the energized condition, the contactor or starter 96 thus serves to control the system by providing for continuation of the control system circuits from its electrical terminals 70 and receives input from the other control cubes.

Figure 17:
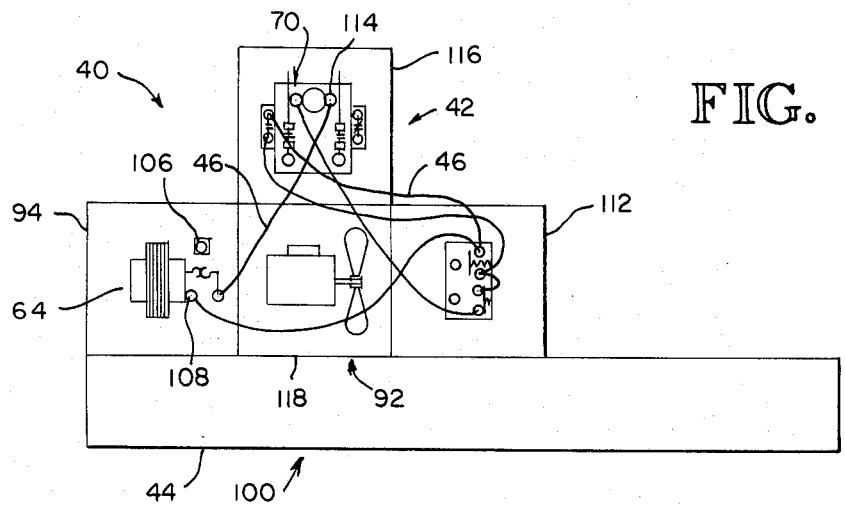
FIG. 17 is a front elevational view illustrating an expanded control system utilizing a contactor with auxiliary and a start-stop station.
Figure 18:
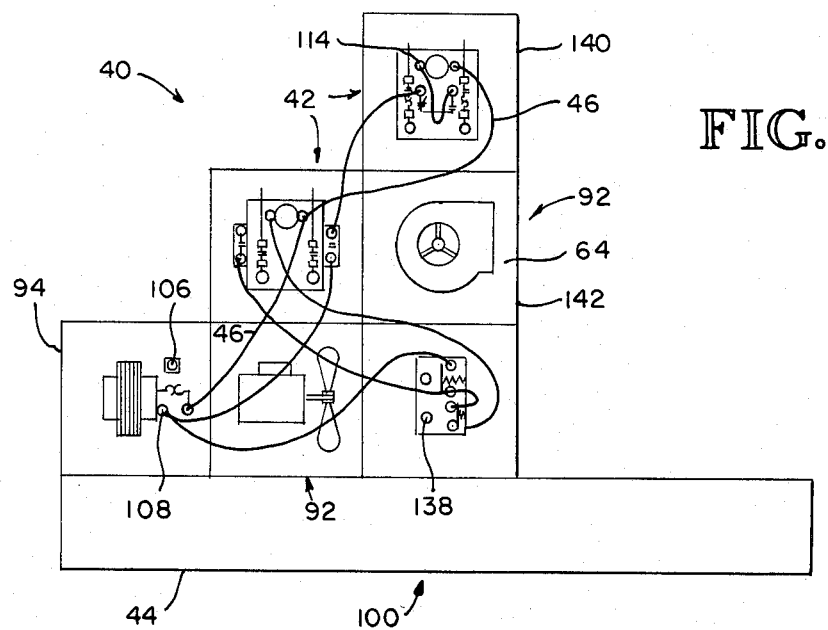
FIG. 18 is a front elevational view with the control system further expanded to include a starter and centrifugal fan simulator.
Figure 19:
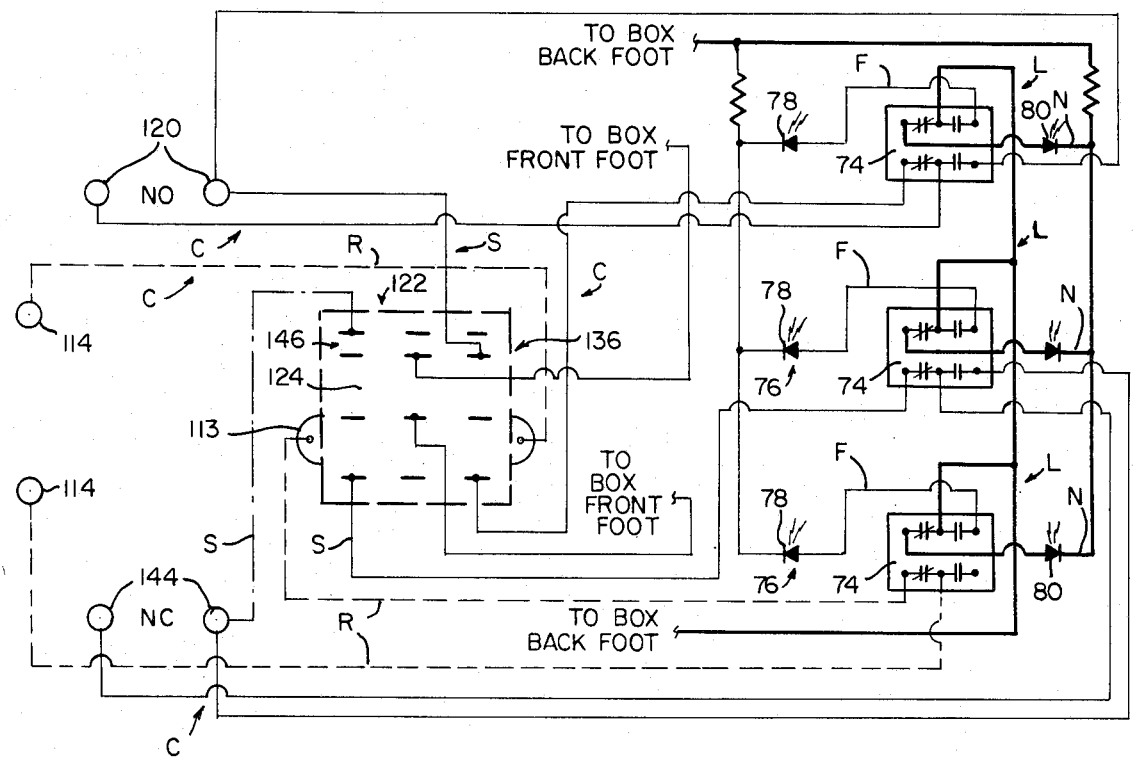
FIG. 19 is a schematic diagram of the circuitry in the contactor with auxiliary.

A plurality of starters or contactors 96 may be used in a single control system. The starter with auxiliary or contact with auxiliary permit alternating interlock of other simulators or controllers as shown in FIGS. 1 and 17 and 18. As shown in FIGS. 7 and 18, a contactor with auxiliary 116 is plugged into a propeller fan simulator cube 118 below and is wired externally to the transformer cube 94. A centrifugal fan simulator is mounted on the power base with a contactor or starter mounted on top of it. The centrifugal fan starter or contactor is then wired through to normally closed auxiliary contacts in the propeller fan contactor. A start-stop station cube 112 is then wired externally to the normally open auxiliary terminals 120 of the contactor with auxiliary cube 116. The contactor with auxiliary cube thereby interlocks the start-stop station 112 for alternating control of the propeller fan cube 118 and the centrifugal fan. The circuitry of the contactor with auxiliary is schematically shown in FIG. 19.

The Control Cubes of the Modular Training System

The control cubes 98 operate individually or in combination with each other to provide an operable control system circuit with the end result being the operation of one or more simulators. Some of the control cubes include conventional electrical components, such as a contact relay, while others merely represent these conventional components, such as a pressure limiting switch or thermostat. The control cubes are adapted to function similarly to a component in an operating control system at a job site. In addition to the indicator light power circuit, the control cube, through their connecting feet 50 through the indicator lights 76 and connectors 54, the control cubes establish control system circuits by receiving secondary or reduced voltage power through external wiring into the terminals 70 on their face plate 64 as shown in FIG. 1.

Control System Circuitry of the Control Cubes as Well as Other Cubes Include Resistance Circuits and/or Switching Circuits A control cube 98 may include control system circuits which further comprise a resistance circuit utilizing a simulated or actual solenoid holding coil. In cubes having resistance circuits, holding coil terminals 114 on the face plates are wired through a fault selection switch 74 to simulate either an operational or faulty holding coil. Other control cubes, such as a relay or starters or contactor cubes, such as a contactor with auxiliary 116, include both resistance circuits R and switching circuits S in the same cube. As shown in FIGS. 14 and 19, auxiliary terminals (contact terminals in the case of relays) are wired through a set of contacts 122 of the relay 124 and through a fault selection switch 74 on the rear panel 72. In addition to the holding coil or resistance circuit, a separate switching circuit S is provided for each set of relay contacts 122.

Other control cubes involve switching circuitry only, such as the thermostat cube, pressure control switch cubes and time clock cubes. Terminals 70 on their face plates 64 are generally wired only through a fault selection switch 74. Some cubes are also adapted to operate with the E.L.R.T. as will be discussed below. These control cubes, such as the remote thermostat cube 126, would normally operate in response to external environmental conditions, such as temperature. For simulation purposes in the cubes, they are operated by using an on-off button (not shown), in the remote thermostat cube 126, for example to indicate that temperature is above or below set point.

Control Cubes Classified According to Their Mode of Operation

The control cubes may be further classified according to their mode of operation. Electrically operated control cubes include various relay cubes, each having actual electrical relay components with various combinations of normally open or normally closed contacts. Control cubes that operate in response to external environmental conditions include thermostat cubes, which normally would operate by temperature change, and high and low pressure control cubes, having pressure sensitive electro-mechanical components in them which would operate in response to increase or decrease in vapor pressure. Using the power base 44, the simulated control system cannot actually generate temperature or pressure changes. These control cubes must operate through manual switching means as previously discussed. Adaption of certain control cubes to the E.L.R.T. allows the system to become automated to some extent and activates the thermostats in the thermostat cubes 126 and pressure sensitive equipment in the pressure limiting switch cubes through actual environmental conditions rather than through manual switching means. This will be discussed further in more detail below.

Mechanically operated control cubes include time clock cubes and timer cubes. Manually operated controllers include the start-stop station.

The individual control cubes, by category, are listed below:

Electrically Operated

Relay, SPST N.O.
Relay, SPST N.C.
Relay, SPDT
Relay, DPST 2-N.O.
Relay, DPST 1-N.O. 1-N.C.
Relay, DPST 2-N.C.
Relay, Lock-Out
Relay, Time Delay
Sequencer (4 Stg)
Manual Potentiometer
Modulating Motor
Modulating Valve
Modulating Valve (3-Way)

External Environmental Conditionally Operated

Thermostat (Remote)
Thermostat (Remote SPDT)
Thermostat, Room 2-Htg 2-Clg
Thermostat, Room Heat Pump
Thermostat, Heat Only (Setback)
Hi-Pressure Control (Cut-Out)
Low Pressure Control
Oil Failure Switch-Timer
Hi-Limit/Fan Limit Temperature
Aquastat/Hi-Limit Temperature
Low Water Cut-Off
Flow Switch
Sail Switch
Defrost Termination T'Stat
4-Stage Temperature Controller
Thermostat, Room (POT)
Thermostat, Remote (POT)

Mechanically Operated

Time Clock
Cycle Timer
Manual By-Pass Timer
Defrost Timer

Manually Operated

Start/Stop Station

Faults or Failures in the Control System Circuits May be Entered by the Instructor to Provide Troubleshooting Problems for Students, and Are Classified as Source Power, Resistance or Switching Failures By manually operating the fault selection switches on the rear panel of the cubes, the instructor, for example, may alternatively enter or remove a variety of failures in the control system circuits that will serve to create troubleshooting problems for students to determine. These failures may be classified as a lack of source power, a failure switch or a resistance switch failure.

Each cube requires source power in some form to operate. A common failure would be that of a lack of source power because of an open circuit. Beginning with the power base 44, the student may visually check the primary line-in power cord 128, the power switch 130 and the circuit breaker 106 to determine obvious failures, such as the power switch 130 being turned off. Further checking of the line-in power and reduced voltage beyond the transformer 104 may be checked with a meter.

As shown in FIG. 5, the transformer cube 94 is provided with a fault selection switch which, when set to the fail position, indicates a resistance failure simulating burned out secondary windings in the holding coil, for example, and thus opens the control system circuit through the transformer cube 94. A subsequent voltmeter check of the "T" and "V" terminals 108 of the transformer cube, as well as of the electrical terminals 70 of starters or contactors, simulator cubes, or control cubes further along in the control system circuit will thus indicate a lack of secondary source power from the transformer cube 94.

The contactors and starter cubes 96 are all provided with the common fault option of providing open resistance through the holding coil to simulate a faulty holding coil of an actual electro-mechanical component the student might encounter in the field. As shown in FIG. 5, the fault selection switch 74 of the contactor cube 132 is placed in the fail position whereby the control system circuit is opened, as shown in FIG. 7. Using an ohmmeter, the student would check the holding coil terminals 114 of the contactor cube 132 in the systematic process to discover a resistance failure simulating, for example, open windings in the holding coil.

Figure 20:
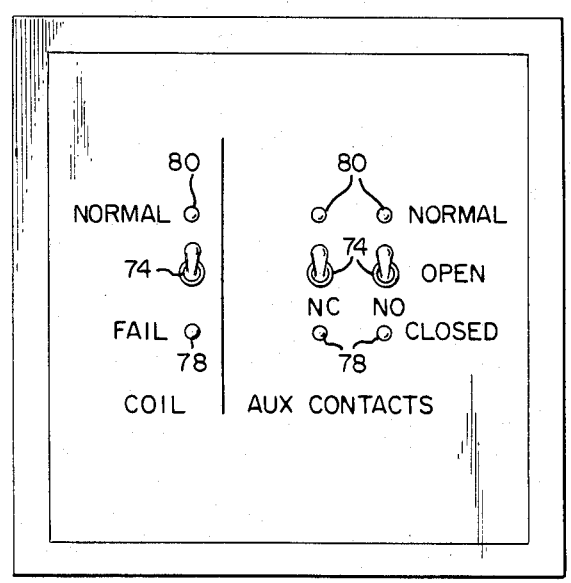
FIG. 20 is an enlarged fragmentary rear view of the rear panel of the contactor with auxiliary.

As shown in FIGS. 14 and 19, the contactor with auxiliary cube 116 is provided with the additional fault capability of having each of its sets of contacts 122 being failed in the open or closed position thereby simulating switching failures. FIG. 19 illustrates the indicator light power circuit L and the various control circuits C of the contactor with auxiliary. A separate switching circuit S of the control circuitry is established for each set of contacts 122, shown in FIG. 19, which may be failed through a fault selection switch 74 on the rear panel 72 as shown in FIG. 20. When the fault selection switch is moved to the fail open position, the switching control circuit, which incorporates the auxiliary terminals 120, the set of relay contacts 122 and the fault selection switch 74, is opened and will remain open even after the holding coil (terminals) are energized. A failed switch in the control system circuit is thereby simulated. Moving the fault selection switch 74 to the fail closed position would thus result in the switching control circuit remaining closed when it was supposed to open. For purposes of student troubleshooting, a determination must first be made of whether the auxiliary contacts 122 are normally open or normally closed when no electrical power is applied. Providing power to the holding coil terminals serves to reverse the normal position of the contacts. The student must do a voltmeter or ohmmeter check of the auxiliary terminals with the system power both on and off.

The starter and starter with auxiliary cubes are designed similarly to the contactor and contactor with auxiliary. The starters, however, are provided with an overload failure capability. The simulated overload failure is also provided by a separate switching circuit through a fault selection switch on the rear panel of the starter with auxiliary cube and starter cube.

Indicator Lights Signify Normal Operation or Failed Conditions of the Control Circuits by Positioning the Fault Selection Switches FIGS. 6–8 and 19 illustrate the indicator light power circuit wiring, shown as unbroken lines L, as well as the control system circuitry as broken lines C. FIG. 6 shows the circuits of the transformer cube. The indicator light power circuits L are further diagrammed as comprising an operating or normal condition N as well as a failed condition F. The fault selection switch 74 when moved to the normal position thus results in lighting the normal L.E.D. indicator light n which is colored green on the rear panel. The fault selection switch in the fail position results in the fail L.E.D. indicator light f being lit, which is colored red on the rear panel as shown in FIG. 6.

Both resistance and switching failures of the other controllers, as well as motor failures in the simulator cubes, are represented similarly by normal and fail indicator light power circuitry and shown in FIGS. 7, 8, and 19. In FIG. 7, the fault selection switch 74 is shown in the normal position whereby the normal indicator light n is lit. The circuit through the holding coil is also completed in the diagram.

The simulator cubes also have fault selection switches 74 which open the control circuit through the motor (L.E.D. lights are used in place of the motor to represent an operable heater in the heater cube). Since there is no external wiring used, the student therefore must determine a simulator resistance related failure through the process of elimination.

The various control cubes include a possible control system failure relative to each function of an electrical component represented by the control cube. A resistance failure, as previously discussed, is simulated by entering a fault in the resistance circuit in the cube 42 while switching failures representing faulty relay contacts, for example, in the applicable cubes 42 may be entered in the switch related circuitry S as well. A double pole double throw relay cube, for example, includes both a resistance failure and switching failures. A resistance circuit R is established for the holding coil of the relay cube while separate switching circuits S are established for each of the sets of contacts of the relay in the relay cube. The resistance circuit R may be failed by placing the fault selection switch for the holding coil on the rear panel of the cube at the fail position. A faulty holding coil, such as having burned windings is thereby simulated. Control cubes, such as the double pole double throw relay, are not shown in the drawings. The contactor with auxiliary 116, however, illustrates both resistance and switching circuits and possible failures in FIG. 19. The diagram of those control cubes which operate with switching failures only, such as a thermostat cube, are shown in FIGS. 6–8 and 19.

Audible Failures of the Controller

Most switching or resistance failures may be visibly detected whereby the simulator, for example, will no longer be operational. In such cases, electrical testing meters and the like will permit the student to observe the lack of source power being generated or switched throughout the system. Several control cubes, however, are provided with audible alarms (not shown in the drawings) to signify failures in the control system which simulate possible further damaging results, such as from excessive temperature or pressure. The high limit/fan limit control cube, for example is adapted to automatically switch on a fan when the temperature fan limit set point has been reached. In a sight control system, should the high limit switch fail closed and the fan limit switch fail open, the temperature would continue to increase thereby increasing the risk of fire or other damage to the system. In order to indicate such failure, the high limit and fan limit switches are connected to fault selection switches on the rear panel of the cube which may be moved to their fail positions. A time delay relay (also not shown) is wired to the fault selection switches and such time delay simulates the increase in temperature and sounds the audible alarm after a pre-designated time has elapsed. Similarly the oil failure switch cube provides an audible alarm when a simulated excessive decrease in oil pressure results in the system when the limit switch fails. These controllers, as well as thermostat cubes and pressure control cubes, operate in response to external environmental conditions which may not be produced by the system. These controllers must thus be operated manually by a switch as previously explained with the remote thermostat cube.

Building and Expanding the Simulated Control Systems: The Addition of Controller Cubes Increases the Complexity and Functional Capabilities of the System An operable electro-mechanical system normally includes components which are operated by line in primary voltage and other components which operate by controlled or reduced voltage. The modular training system 40 incorporates elements of both the primary and reduced voltage sides of the electrical system. The simulator cubes 92 are normally components of the primary voltage side of the electrical system with line-in power being transferred directly to the simulator in addition to the primary windings of the transformer cube 94. For purposes of the training system, however, stepped down voltage is provided to all cubes from the power base. Voltage reduction in the transformer cube 94 as well as line-in power to the simulator cube are therefore both simulated. All other aspects of the control systems are designed to function similarly to a system encountered at a job location.

The basic operable training system includes a power base, transformer cube, simulator cube and a contactor or starter cube.

FIGS. 16 to 18 illustrate the development of a control system whereby additional controllers are used to provide for increased capacity and capability of the system, as well as interlocking several simulator cubes and primary voltage control cubes. FIG. 16 shows the transformer cube 94 and propeller fan simulator 118 mounted on the power base 44. A contactor cube 132 is mounted on top of the propeller fan simulator 118. External control circuit patch cords 46 connect and complete a control system circuit between the "T" and "V" terminals 108 of the transformer cube 94 with the holding coil 113 of the contactor cube 132. With no faults selected or failures entered into the control system circuits, a simple propeller fan exhaust system is simulated whereby electrical power is transferred from the power base 44 to the simulator and (simulated) to the primary windings of the transformer 104 of the transformer cube 94. Controlled power is then transferred from the transformer cube 94 to the contactor cube 132, thus completing the control system circuit necessary to power the propeller fan simulator 118.

The fault selection switch 74 may be used to enter a resistance failure in either the contactor cube 132 or transformer cube 94 as shown in FIGS. 5 and 7. A failure may also be entered in the simulator cube 94 to indicate a defective motor for example.

In FIG. 17, a contactor with auxiliary 116 replaces the contactor cube 92 and a start-stop station 112 is added to the control system. As shown in the diagram, external control system circuit wiring extends from the source T terminal 108 of the transformer cube to the start-stop station 112, then to the holding coil terminal 114 of the contactor with auxiliary and finally back to the V terminal 108 of the transformer cube. An auxiliary control circuit is also externally wired with patch cords 46 between the normally open auxiliary terminals 120 of the contactor with auxiliary 116 and the normally open contact terminals 134 of the start-stop station 112. Manually operating the start-stop station 112 transfers power to and energizes the holding coil 113 of the contactor with auxiliary 116, which in turn closes a set of normally open auxiliary contacts 136 of the relay 124 to energize both control circuits and power the propeller fan simulator. Should the normally open auxiliary contacts 136 be opened again, the start button (not shown) on the start-stop station must be pushed again before the propeller fan may be started again. In addition to the previous failures which could be entered, the start-stop station adds additional possible switching failures for both the start switch (failure in the open or close position) and the stop switch (not shown) (failure in the open or close position).

FIG. 18 provides further building of the control system, adding a simulator, by externally wiring a starter 140 with a centrifugal fan simulator 142 into the control system circuits. As shown in the diagram, the starter is wired with patch cords 46 to the normally closed auxiliary terminals 144 connected to the normally closed auxiliary contacts 146 of the contactor with auxiliary. These auxiliary contacts 146 are normally in the closed position when no power is applied to the system. The start button on the start-stop station 112 is again pushed to energize the holding coil 113 of the contactor with auxiliary. As in the previous example, the normally open auxiliary contacts 136 are thereby closed to complete the circuit and operate the propeller fan 118. At the same time, the set of normally closed auxiliary contacts 146 are now opened, opening the added simulator control system circuit and preventing operation of the centrifugal fan 142. Should an overload result, for example, the position of the two sets of contacts would be reversed and the centrifugal fan 142 would start. The additional simulator and controller are thus interlocked as are the contactor with auxiliary and start-stop station.

Additional failures may also be entered into the control system circuitry through the starter cube 140 including switching failures (contact overloads) or resistance failures (holding coil of the starter). The fault selection switch of the centrifugal fan simulator may also enter a failure.

Additional control cubes, such as a thermostat cube 126, may be wired into the control system circuits as well as other simulators and contactor or starter cubes. Several power bases may also be used to construct even larger total training systems in more advanced applications of training.

Figure 12:
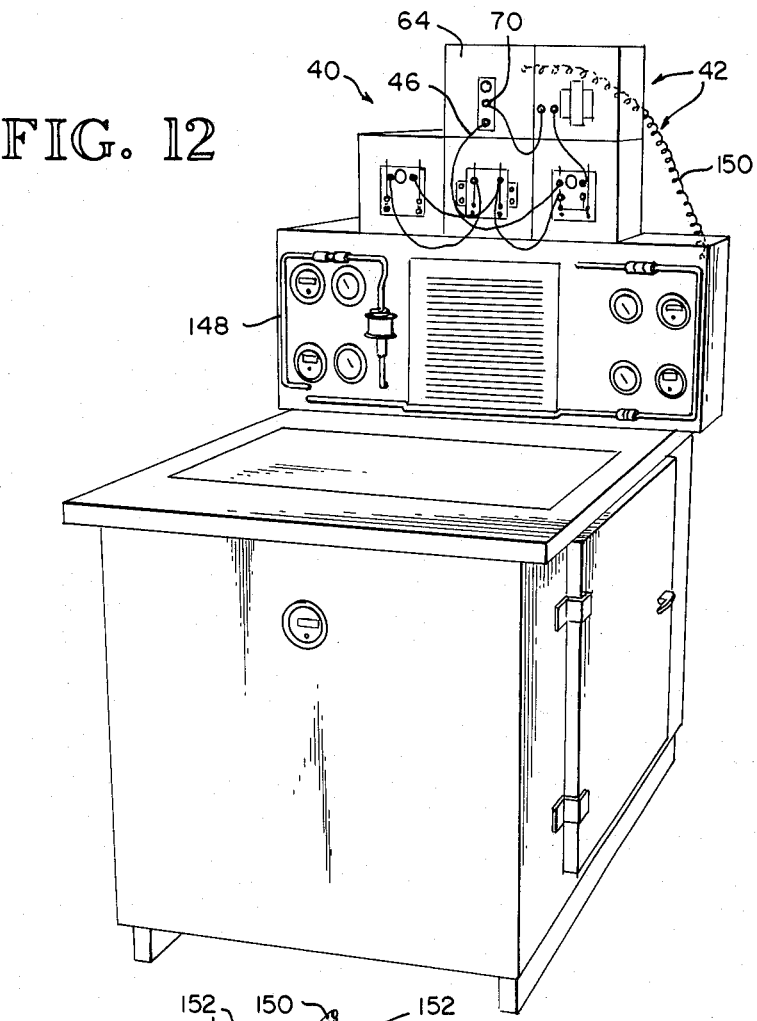
FIG. 12 is a perspective view of the E.L.R.T. with a plurality of cubes attached.
Figure 13:
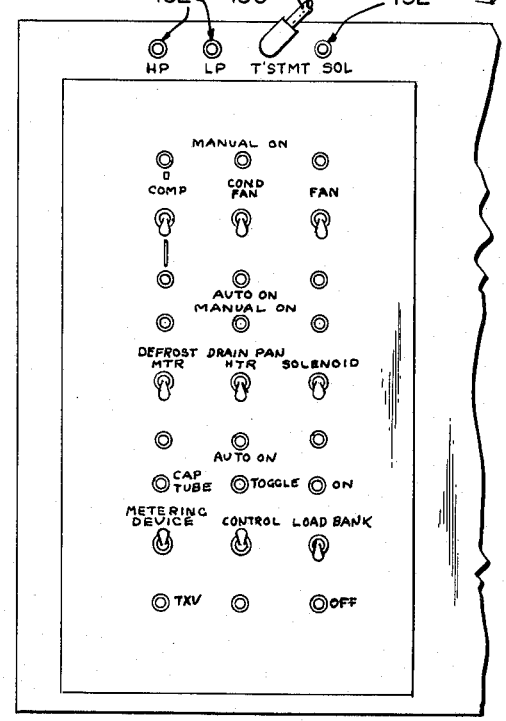
FIG. 13 is an enlarged elevational view of the back panel of the E.L.R.T.

The Cubes of the Modular Training System May be Adapted for Use With an Entry Level Refrigeration Trainer to Provide An Alternative Primary Power Source and Partial Automated Operation of the Control System As previously discussed, the various operations of the control cubes must be simulated by electrical switching means rather than external environmental conditions, such as temperature and pressure. The entry level refrigeration trainer, or E.L.R.T., 148 provides the student with an actual operating mechanical refrigeration system whereby temperature or pressure differences are actually generated. The E.L.R.T. 148 provides for an alternative source of primary power for the modular training system 40, as well as automatic operation of some of the control cubes, such as the remote thermostat cube 126. The high pressure control cube, low pressure control cube, remote thermostat cube, as well as the solenoid valve simulator cube, are all secondary power cubes which may be adaptively controlled by the E.L.R.T. 148 as shown in FIGS. 12 and 13. The E.L.R.T. 148 may be used as a separate training apparatus or in combination with the cubes as part of the modular training system. The E.L.R.T. 148 comprises a variety of conventional electro-mechanical components mechanically and electrically connected to function similarly to an on site operating refrigeration system.

A selected group of controller and simulator cubes, including one or more of the adaptably automated control cubes, are plugged into the top of the E.L.R.T. 148 rather than the power base 44, as shown in FIG. 12. As with the power base 44, the E.L.R.T. 148 provides power through the rear feet 50 of each cube for the indicator lights 76 on the rear panel 72. The remote thermostat cube 126, for example, is included as part of the control system. A small patch cord 150 extends from the rear panel of the remote thermostat cube 126 and is plugged into the appropriate jack 152 in the back of the E.L.R.T. 148 as shown in FIG. 13. The control circuit may then be externally wired with control circuit patch cords 46 by the student in similar fashion to using the power base 44. Actual temperature changes within the E.L.R.T. 148 will be automatically controlled by the remote thermostat control cube rather than being simulated as with the use of the power base. The set point may be adjusted by the instructor on the actual thermostat in the E.L.R.T.

When the remote thermostat cube 126 is mounted on the power base 44, an on-off pushbutton on the front of the cube simulates temperatures above and below set point in the manually operated simulation environment.

Simulators would not normally be used with the E.L.R.T.

Final Considerations

The modular training system is primarily designed as a training tool which simulates control systems that a student would likely encounter at a job site in the field. Adaption of the E.L.R.T. provides for automation of certain parts of the system to allow the student to see the various components operate as they would in an on site operating control system.

Some of the control cubes, including the room thermostats, have an actual working component, such as a stat on the outside of the cube rather than having a diagram and using a pushbutton. A working slide lever on the outside of the stat, for example, is used to set the thermostat above or below set point. Similarly other of the controllers and simulators may utilize components on the outside of the cube to provide a more realistic training system.

For cubes that function with external environmental conditions, such as the remote thermostat, different colored indicator lights are provided to simulate a condition that has changed internally in the system. An example would be that one color light is shown on the thermostat indicating temperature is below the minimal set point. Another color is used to show temperatures have risen above maximum set point.

Other cubes, such as the propeller fan serve different functions such as for heating, cooling or ventilation. Different colored lights are also used to show the different mode selection of these cubes, as shown in FIG. 5. The schematic diagram in FIG. 8 also shows mode selection circuitry Z illustrating three different colored mode lights 156. The mode lights 156 are wired to the mode selector switches 154 as shown on the propeller fan rear panel in FIG. 5.

To assist the instructor in preparing a control circuit diagram, an instruction manual is offered which explains the various functions of the controller and simulator cubes and includes diagrams and lesson plans which allow for the student to perform certain tasks and assist in learning the operation and training aspects of the control system.

While the training system basically comprises the primary areas of refrigeration, air conditioning, heating and ventilation, other systems may be simulated, such as hydraulic, pneumatic or other electro-mechanical systems as new cubes are developed. It is projected that the total of 60 cubes will be fully operational to comprise additional control systems in the near future.

I claim:

1. A module for use in a training system assembly which includes a power base, comprising:
    (a) said module being multi-sided and including first electrical connector means on one side for jacking said module into said power base or a second module for supplying power thereto;
    (b) said module including second electrical connector means on a second side thereof opposite said one side for jacking said module into a second module and for supplying power thereto;
    (c) said module comprising a receptacle having an electrical component mounted therein;
    (d) said electrical component having leads electrically connected to at least one of said first and second electrical connector means;
    (e) said module including electrical display means on a third side thereof;
    (f) said electrical component having leads connected to said electrical display means;
    (g) said module including operator control means on a fourth side thereof;
    (h) said electrical component having leads connected to said operator control means; and,
    (i) said first and second electrical connector means also providing vertical structural support for the modules when stacked on said base.

2. The module of claim 1, wherein:
    (a) said electrical component including fault simulation means; and,
    (b) said operator control means adapted for causing selected operation of said fault simulation means.

3. The module of claim 2, further including:
    (a) fault indication means being associated with said operator control means for indicating simulation of a fault.

4. The module of claim 1, further including:
    (a) support means being associated with said module for interconnecting said module with an adjacent second module and for providing lateral support for said modules when interconnected.

5. The module of claim 4, wherein said support means including:
    (a) peg means extending from a side of said module; and,
    (b) a slot associated with another side of an adjacent module for receiving said peg means and for thereby interconnecting said modules.

6. The module of claim 1, further including:
    (a) electrical contact means being associated with one of said sides and being operably connected with said component for permitting interconnection of said component with a component of a second module.

7. The module of claim 1, wherein:
    (a) said first electrical connector means including a foot extending from said one side; and,
    (b) said second electrical connector means including foot receiving means.

8. The module of claim 7, wherein:
    (a) said foot receiving means including detent spring latches.

9. The module of claim 7, further including:
    (a) an aperture being disposed in said another side; and,
    (b) said foot receiving means being in cooperative alignment with said aperture so that said foot extends through said aperture so as to be received in said foot receiving means when a second module is jacked to said module.

10. The module of claim 1, further including:
    (a) means removably covering said operator control means.

11. The module of claim 1, wherein:
    (a) said module being cubical.

12. The module of claim 11, wherein:
    (a) said another side being disposed opposite to said first side so that said first and second electrical connector means are aligned.

13. The module of claim 1, wherein:
    (a) said electrical component leads being electrically connected to said first and second electrical connector means.

14. A module for use in a training system assembly which includes a power source, comprising:
    (a) a cubical receptacle having a hollow interior and a bottom, a top and sides;
    (b) first mechanical-electrical connector means extend from said bottom and are adapted for being mounted to said power supply for supplying power to said receptacle;
    (c) second mechanical-electrical connector means associated with said top and adapted for receiving the first mechanical-electrical connector means of a second receptacle when mounted atop said first receptacle;
    (d) an electrically operated component positioned in said receptacle and said component having a first operating configuration and a second fault configuration;

(e) means electrically connecting said component with said first and second mechanical-electrical connector means;

(f) display means associated with one of said sides and being operably connected with said component for indicating the configuration of said component;

(g) fault selector means associated with one of said sides and being operably connected to said component for selectively disposing said component in one of said configurations; and, (h) said first and second mechanical-electrical connector means also providing vertical structural support for the modules when stacked on said base.

15. The module of claim 14, further including:

(a) fault indication means being positioned adjacent said fault selector means for indicating the configuration of said component.

16. The module of claim 15, further including:

(a) removable cover means being associated with the side of said receptacle having said fault selector means for covering said fault selector and indication means.

17. The module of claim 14, wherein:

(a) said first mechanical-electrical connector means including a plurality of feet, each of said feet being proximate one of the corners of said bottom;

(b) said second connector means including at least four apertures in said top surface, each of said apertures aligned with one of said feet; and, (c) detent spring latch means being secured to said top and each of said latch means being aligned with one of said apertures and being positioned in the interior of said receptacle and each of said latch means adapted for receiving the foot of a second receptacle when positioned atop said first mentioned first receptacle.

18. The module of claim 14, further including:

(a) a peg extending from one of said sides; and, (b) a slot being disposed in the side opposite the side having said peg whereby said peg is positionable in the slot of an adjacent receptacle for providing lateral support for said receptacle.

19. The module of claim 14, further including:

(a) terminal means being associated with one of said sides and being electrically connected to said component and being adapted for connection with terminal means of a second receptacle for thereby providing a control circuit.

20. The module of claim 14, wherein:

(a) said display means including a pictorial diagram representative of said component.

21. A modular training assembly, comprising:

(a) a base including power supply means;

(b) first mechanical-electrical connector means associated with a surface of said base and being connected with said power supply means;

(c) at least a first simulator module, said simulator module being multi-sided and including second mechanical-electrical means on a first side thereof received within said base first mechanical-electrical connector means for establishing electrical connection therewith and for removably securing said simulator module to said base;

(d) said simulator module having first mechanical-electrical connector means on a second side thereof opposite said first side and an electrically operable component positioned within said simulator module and being in electrical connection with said first and second mechanical-electrical connector means for simulating a selected function;

(e) display means on another side of said module in electrical connection with said component for displaying operation of said component;

(f) said component having a first operating configuration and a second fault configuration;

(g) fault selector means associated with another side of said module and being electrically connected to said component for selectively disposing said component in one of said configurations;

(h) a control module, said control module being multi-sided and including second mechanical-electrical connector means on a first side thereof received within said simulator first mechanical-electrical connector means for establishing electrical connection therewith and for removably securing said control module to said simulator module;

(i) an electrically operable control component disposed within said control module and being electrically connected with said control module second mechanical-electrical connector means for controlling operation of said simulator module component;

(j) display means on another side of said control module electrically connected with said control component for indicating operation of said control component, said control component having an operating configuration and a fault configuration;

(k) fault selector means electrically connected with said control component for disposing said control component in one of said configurations; and, (l) said first and second mechanical-electrical connector means also providing vertical structural support for said modules when stacked together on said base.

* * * * *